United States Patent
Somanath et al.

(10) Patent No.: US 11,878,718 B2
(45) Date of Patent: Jan. 23, 2024

(54) AUTONOMOUS VEHICLE RIDER DROP-OFF SENSORY SYSTEMS AND METHODS

(71) Applicant: Ford Global Technologies, LLC, Dearborn, MI (US)

(72) Inventors: Nithya Somanath, Farmington Hills, MI (US); Bhagyashri Satyabodha Katti, Novi, MI (US); Joseph Wisniewski, Royal Oak, MI (US); Finn Finn Tseng, Ann Arbor, MI (US); Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 17/408,279

(22) Filed: Aug. 20, 2021

(65) Prior Publication Data
US 2023/0058007 A1 Feb. 23, 2023

(51) Int. Cl.
| | |
|---|---|
| *B60W 60/00* | (2020.01) |
| *B60W 40/02* | (2006.01) |
| *G08B 21/24* | (2006.01) |
| *B60W 40/08* | (2012.01) |
| *G06V 20/58* | (2022.01) |

(52) U.S. Cl.
CPC ........ *B60W 60/0016* (2020.02); *B60W 40/02* (2013.01); *B60W 40/08* (2013.01); *B60W 60/00253* (2020.02); *G06V 20/58* (2022.01); *G08B 21/24* (2013.01); *B60W 2540/043* (2020.02)

(58) Field of Classification Search
None
See application file for complete search history.

(56) References Cited

U.S. PATENT DOCUMENTS

| | | | |
|---|---|---|---|
| 2019/0047498 A1 | 2/2019 | Alcaidinho et al. | |
| 2019/0133511 A1 | 5/2019 | Migneco et al. | |
| 2019/0251376 A1* | 8/2019 | Stoffel | B60Q 3/76 |
| 2020/0061332 A1 | 2/2020 | Dry et al. | |
| 2020/0125989 A1* | 4/2020 | Sucan | B60W 50/0098 |
| 2020/0160709 A1* | 5/2020 | Ramot | B60W 60/00253 |
| 2020/0238953 A1* | 7/2020 | Spasovski | G06V 20/59 |
| 2020/0408531 A1* | 12/2020 | Leary | G01C 21/3423 |

(Continued)

OTHER PUBLICATIONS

A. Meschtscherjakov "Bubble Margin: Motion Sickness Prevention While Reading on Smartphones in Vehicles" (Aug. 2019).

*Primary Examiner* — James J Lee
*Assistant Examiner* — Steven Vu Nguyen
(74) *Attorney, Agent, or Firm* — Brandon Hicks; Eversheds Sutherland (US) LLP (57) ABSTRACT

A method for controlling a vehicle includes identifying a user identity associated with a user riding in the vehicle, determining a destination associated with the user identity, creating a detection zone proximate to the vehicle when the vehicle is localized in a first drop-off location associated with the destination, causing a sensory system to identify a hazard within the detection zone and generate a localization of the hazard, determining that a first probability of realizing a risk associated with the hazard is less than a first probability threshold, and generating a vehicle door actuation that permits the user to exit the vehicle based on the first probability of realizing the risk.

16 Claims, 5 Drawing Sheets

(56) References Cited

U.S. PATENT DOCUMENTS

| | | | |
|---|---|---|---|
| 2021/0012253 A1* | 1/2021 | Heyl | G08G 1/01 |
| 2021/0018916 A1* | 1/2021 | Thakur | G07C 5/0808 |
| 2021/0061224 A1* | 3/2021 | Kim | B60W 60/00253 |
| 2022/0119005 A1* | 4/2022 | Gerrese | G05D 1/0276 |
| 2022/0327651 A1* | 10/2022 | Trim | G06Q 50/30 |
| 2023/0046071 A1* | 2/2023 | Arunmozhi | G08B 3/00 |

* cited by examiner

AUTONOMOUS VEHICLE RIDER DROP-OFF SENSORY SYSTEMS AND METHODS

BACKGROUND

When a vehicle rider exits a vehicle in the presence of environmental hazards, the rider may be alerted to those hazards prior to exiting the vehicle either by observing the presence of potential dangers or by receiving an alert from another vehicle occupant that may spot the hazard. Environmental or other obstacles such as iced or wet surfaces, potholes, uneven walkways or other hazards may be present but unseen by the rider. This may be the case for distracted ridehail customers, those with visual or other disabilities, or in other situations where the rider may not be able to see the surrounding environment. Human drivers, in those instances, may spot the hazards and alert the occupant prior to exiting the vehicle.

As autonomous vehicles (AVs) become increasingly used for ridehail services, a human occupant other than the ridehail customer may be unavailable to perform this environmental check on behalf of the rider. It is advantageous to provide a system that assists rider when the rider exits the vehicle. At the point of egress, it may be advantageous for an AV ridehail vehicle to include sensory and artificial intelligence systems that determine a potential hazard observation of a drop-off point, select a position for drop-off, and provide advisory messages to the rider at the point of egress.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure will be described more fully hereinafter with reference to the accompanying drawings, in which example embodiments of the disclosure are shown, and not intended to be limiting.

Disclosed are systems for mitigating risks associated with ride hail passengers after the passenger is dropped off at their destination in an autonomous vehicle (AV). The sensors around the vehicle may conduct critical object detection once the user arrives at the destination. Responsive to determining that the scene is clear, the vehicle may open the doors to unload the rider. If a suitable place is not found, the system may pursue the next alternate drop off to complete the trip, or may schedule an alternative AV for the user to take.

DETAILED DESCRIPTION

Figure 1:
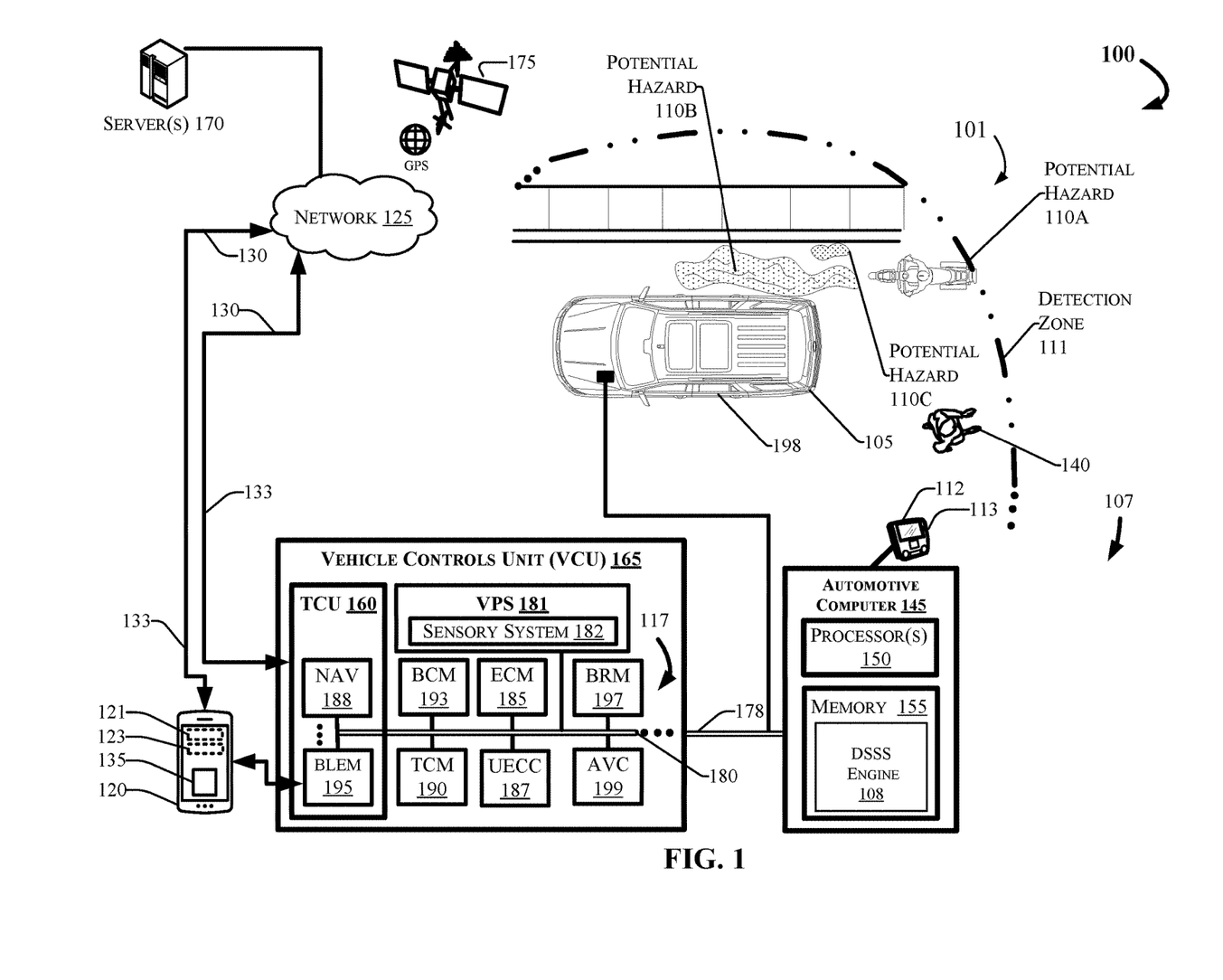
FIG. 1 depicts an example computing environment in which techniques and structures for providing the systems and methods disclosed herein may be implemented.

Disclosed are systems and methods for mitigating risks associated with drop-off destination environments for riders (users) of a vehicle 105, which may be an autonomous vehicle (AV). FIG. 1 depicts an example computing environment 100 that depicting the vehicle 105 at a ridehail drop-off site 101. The vehicle 105 may include an automotive computer 145, and a Vehicle Controls Unit (VCU) 165 that can include a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

The vehicle 105 may include a drop-off sensory system (DSS) engine 108 instantiated in a memory 155 of the automotive computer 145. The DSS engine 108 may be configured and/or programmed to detect, using a vehicle perception system (VPS) 181, critical objects or other potential hazards surrounding the vehicle 105 upon arrival at the drop-off site 101. The area viewable by the vehicle 105 is considered a detection zone 111. Examples of potential or identified hazards are shown in FIG. 1 that may include, a nearby moving vehicle 110A, standing water 110B, an infrastructure defect 110C such as a pothole, or any number of other possible hazards that may cause discomfort or harm to the user 140.

After determining that the detection zone 111 surrounding the vehicle 105 is clear of identified potential hazards 110, and/or the rider has been alerted as to any potential hazards, the vehicle 105 may open one or more vehicle doors 198 to unload the rider (referred to hereafter as a user 140). Additionally, the vehicle 105 may utilize weight sensors in vehicle seats, walls, arm rest, seat pockets, or other portions of the AV (not shown in FIG. 1) to determine if the user 140 has forgotten to take belongings with them when they exit the vehicle 105. For example, the vehicle 105 may use weight sensors (not shown in FIG. 1) in the seats, walls, arm rest, seat pockets, or other portions of the vehicle to determine if the user 140 has forgotten to take their belongings with them when they exit the AV.

If the drop-off sensory system 107 evaluates the detection zone 111 at the planned drop-off site 101 and a suitable point of egress is not found, the drop-off sensory system 107 may navigate to an alternate drop-off position for trip completion (alternate drop-off site not shown in FIG. 1), or may schedule an alternative AV to meet the user 140 near the drop-off site 101 for trip completion. In some aspects, after initiating the ride hail, the drop-off sensory system 107 may reference one or more databases (not shown in FIG. 1) to determine a relative risk associated with a particular geographic region for the user pickup. The system 107 may warn of the pickup location responsive to determining that there is a heightened risk associated with criminal activity or another environmental risk by generating a text, email, automated call, etc. The system 107 may output an inquiry message to the user to ask if the user wishes to choose a relatively place to pick-up with higher relative security and/or lower relative risk of harm to the user 140. In another aspect, the system 107 may be aware of special needs associated with the ridehail passenger (e.g., the user 140), such as the need for a wheelchair pickup location. If the system 107 is aware of physical limitations and is also aware (by means of a prior experience that is recorded in a persistent memory (not shown in FIG. 1) having data associated with the particular pickup request location, the system 107 may recommend an alternate pickup site and/or direct the vehicle 105 to be closer to a wheelchair-accessible ramp.

In another aspect, if the drop-off site 101 is secluded, the vehicle 105 may drop-off the user 140 (by letting the user exit the vehicle 105) and waiting nearby the user 140 as an escort. Accordingly, the vehicle 105 may utilize the VPS 181 to monitor the user 140 as they wait for the alternative transport (not shown in FIG. 1). That is, the vehicle 105 may establish a geofence around the vehicle that is deemed a suitable local zone based on the current location of the AV, where the detection zone 111 illustrates a dashed line that may represent an example geofence inside of which the environment is monitored.

The vehicle 105 may monitor a position of the user 140 with respect to the vehicle to determine if the user has left the suitable zone (e.g., the detection zone 111). If the vehicle 105 determines that the user 140 has left the detection zone 111, then the ridehail/user interaction is considered complete, and the AV may proceed to a new rider or destination.

If the user has not left the detection zone 111 after a period of time has passed, the drop-off sensory system 107 may carry out one or more checks using sensors and cameras associated with the sensory system 182 disposed on exterior vehicle 105 surfaces and/or in the interior (cabin) surfaces, to determine whether the user 140 has experienced any potential hazards 110 identified in the detection zone 111. For example, the sensory system 182 may cause a biometric recognition module (e.g., the biometric recognition module 297 described with respect to FIG. 2) to detect user 140 body posture and heart rate, voice, or other biometric indicators of distress. The vehicle 105 may also generate output in the form of an audible or text-delivered question to the user 140, and determine from a user response (not shown in FIG. 1) whether the user 140 is experiencing any potential hazards (e.g., the potential hazards 110). Responsive to determining that the user 140 is experiencing a hazard, the drop-off sensory system 107 may perform a mitigating action based on feedback from the rider. Mitigating actions can include actuating the vehicle 105 to travel to another drop-off location, sounding an alarm or an alert, generating a warning message, unlocking or locking one or more vehicle doors, and/or any number of other possible actions. For example, in one embodiment where the drop-off sensory system 107 determines that the drop-off location 101 is a high traffic area, the drop-off sensory system 107 may output one or more warnings such as cabin lights and speakers to warn the user 140 of possible approaching danger. The warning may further include information indicative of direction of the potential hazard that is approaching. In other aspects, the drop-off sensory system 107 may further include interior lights (not shown in FIG. 1) that may provide additional viewability of the cabin interior and/or exterior. This can use visible or audible warnings from the passenger or the driver side of the vehicle 105, and rear or front of the vehicle 105, which may help people with limited senses.

Now considering the drop-off sensory system 107 in greater detail, in some aspects, the drop-off sensory system 107 may include a mobile device 120 having an application 135 that provides drop-off sensory system 107 outputs (e.g., questions, alerts, reminders, etc.), and receives a user-selectable option for choosing an alternative drop-off location, a choice of alternate ridehail vehicle if needed, an indication that the ridehail trip is complete and the AV may conclude the present trip, and/or an indication that the user is experiencing a danger or potential hazard.

The vehicle 105 may also receive and/or be in communication with a Global Positioning System (GPS) 175. The GPS 175 may be a satellite system (as depicted in FIG. 1) such as the global navigation satellite system (-GNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, a drone, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, although described herein as primarily an AV, it should be appreciated that the vehicle 105 may be a manually driven vehicle, or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

The mobile device 120 can include a memory 123 for storing program instructions associated with the application 135 that, when executed by a mobile device processor 121, performs aspects of the disclosed embodiments. The application (or "app") 135 may be part of the drop-off sensory system 107, or may provide information to the drop-off sensory system 107 and/or receive information from the drop-off sensory system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 130 that can be direct connection(s) between the vehicle 105 and the mobile device 120. The wireless connection(s) 130 may include various low-energy protocols including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the drop-off sensory system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a drop-off sensory program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a User Experience and Communication Controller (UECC) 187, the AVC 199, etc. The VCU 165 may further include and/or communicate with the VPS 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the drop-off sensory system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the drop-off sensory system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the drop-off sensory system 107, and/or via wireless signal inputs received via the wireless connection(s) 130 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 130 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

According to one or more embodiments, the BCM 193 may receive a vehicle door actuation command that permits a user to exit the vehicle 105 based on command(s) received from the drop-off sensory system 107.

Figure 2:
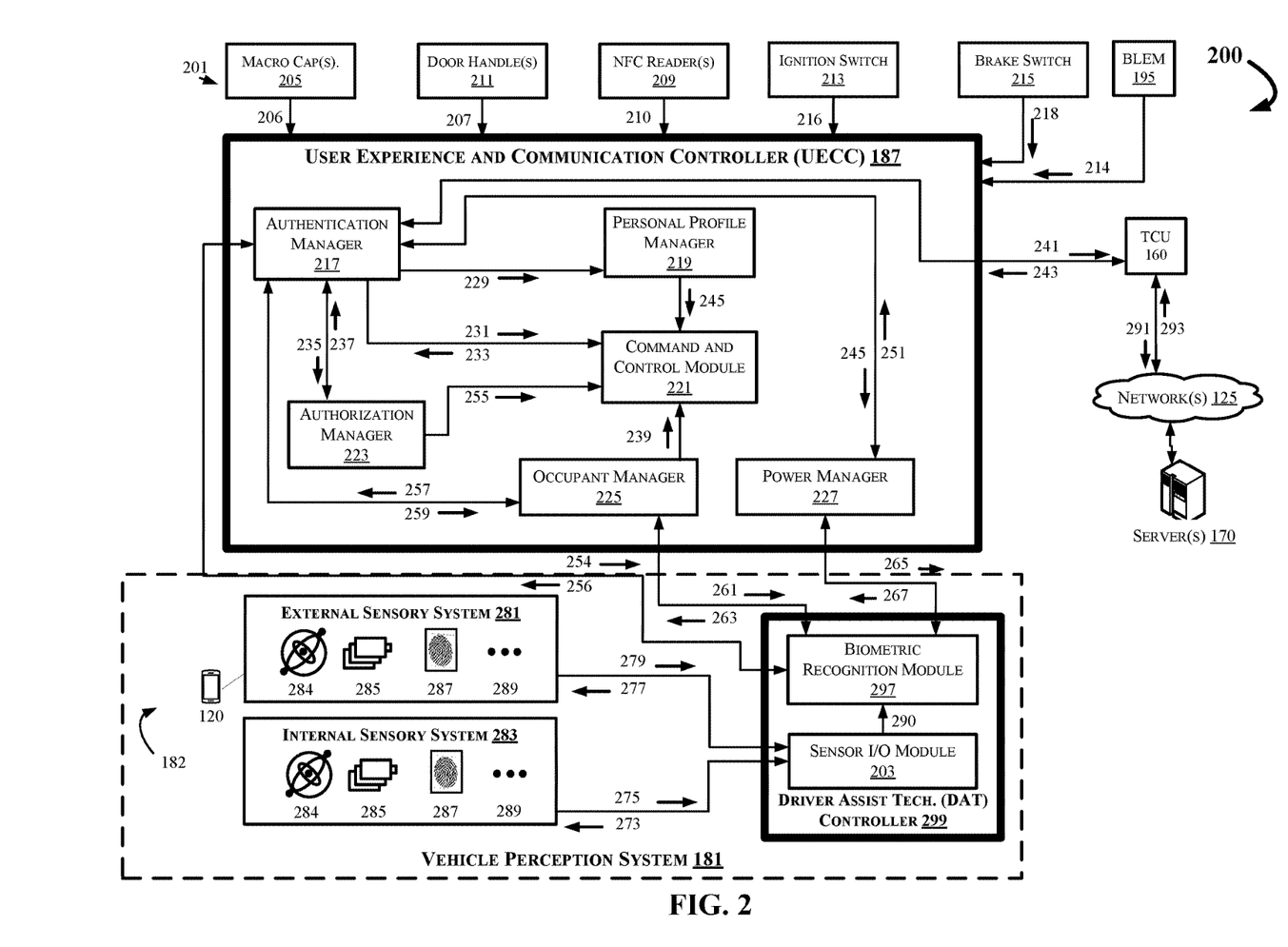
FIG. 2 illustrates a biometric authentication and occupant monitoring interface diagram in accordance with the present disclosure.

The UECC 187, described in greater detail with respect to FIG. 2, can include sensory and processor functionality and hardware to facilitate user and device authentication, and provide occupant customizations and support that provide customized experiences for vehicle occupants. The UECC 187 may connect with the AVC 199 configured and/or programmed to provide biometric authentication controls, including, for example, biometric recognition and monitoring, and/or other information associated with characterization, identification, and/or verification for other human factors such as gait recognition, body heat signatures, eye tracking, etc.

The AVC 199 may provide Level-1 through Level-3 automated driving and driver assistance functionality. The AVC 199 may also provide aspects of user and environmental inputs usable for user authentication. Authentication features may include, for example, biometric authentication and recognition.

The AVC 199 can obtain input information via the sensory system(s) 182, which may include sensors disposed on the vehicle interior and/or exterior (sensors not shown in FIG. 1). The AVC 199 may receive the sensor information associated with driver functions, vehicle functions, and environmental inputs, and other information. The AVC 199 may characterize the sensor information for identification of biometric markers stored in a secure biometric data vault (not shown in FIG. 1) onboard the vehicle 105 and/or via the server(s) 170.

The AVC 199 may connect with and/or include the VPS 181, which may include internal and external sensory systems (collectively referred to as sensory systems 182). The sensory systems 182 may be configured and/or programmed to obtain sensor data usable for biometric authentication, and for performing driver assistances operations such as, for example, active parking, trailer backup assistances, adaptive cruise control and lane keeping, driver status monitoring, and/or other features.

The computing system architecture of the automotive computer 145, VCU 165, and/or the drop-off sensory system 107 may omit certain computing modules. It should be readily understood that the computing environment depicted in FIG. 1 is an example of a possible implementation according to the present disclosure, and thus, it should not be considered limiting or exclusive.

The automotive computer 145 may connect with an infotainment system 113 that may provide an interface for the navigation and GPS receiver (e.g., the NAV 188), and the drop-off sensory system 107. For example, the infotainment system 113 may provide an audible and/or visual indication of potential hazards 110 that may be in the detection zone 111, receive user feedback for selecting or requesting a second drop-off location, etc. The infotainment system 113 may include a touchscreen interface portion 112, and may include voice recognition features, biometric identification capabilities that can identify users based on facial recognition, voice recognition, fingerprint identification, or other biological identification means. In other aspects, the infotainment system 113 may provide user identification using mobile device pairing techniques (e.g., connecting with the mobile device 120, a Personal Identification Number (PIN)) code, a password, passphrase, or other identifying means.

FIG. 2 illustrates a functional schematic of an example architecture of a biometric authentication and UECC 187 that may be used for providing hazard mitigation in the detection zone 111 (as shown in FIG. 1) and for providing user support and customization for the vehicle 105, in accordance with the present disclosure.

The UECC 187 may authenticate passive device signals from a Passive Entry Passive Start (PEPS)-configured device such as the mobile device 120, a passive key device (not shown in FIG. 1, such as a fob (not shown in FIG. 1)), and provide vehicle entry and signal authentication using biometric information and other human factors. The biometric and occupant monitoring system 200 may also provide user support and customizations to enhance user experience with the vehicle 105. The UECC 187 may be disposed in communication with the AVC 199, the TCU 160, the BLEM 195, and a plurality of other vehicle controllers 201, which may include vehicle sensors, input devices, and mechanisms. Examples of the plurality of other vehicle controllers 201 can include, one or more macro capacitor(s) 205 that may send vehicle wakeup data 206, the door handle(s) 211 that may send passive entry passive starting (PEPS) wakeup data 207, NFC reader(s) 209 that send NFC wakeup data 210, an ignition switch 213 that can send an ignition switch actuation signal 216, and/or a brake switch 215 that may send a brake switch confirmation signal 218, among other possible components.

The AVC 199 may include and/or connect with the biometric recognition module 297 disposed in communication with the AVC 199 via a sensor Input/Output (I/O) module 203. The UECC 187 may connect with the AVC 199 to provide biometric authentication controls, including, for example, facial recognition, fingerprint recognition, voice recognition, and/or other information associated with characterization, identification, and/or verification for other human factors such as gait recognition, body heat signatures, eye tracking, etc. In one aspect, the UECC 187 may determine, using the VPS 181, that the user 140, who may have exited the vehicle 105, is waiting in the detection zone 111 and experiencing distress. The UECC 187 may make such a determination based on visual or audible factors such as calling for help, shouting or fearful speech, rapid breathing, increased heart rate, etc. Any combination of such biometric feedback received from a user within the detection zone 111 may indicate the need to generate a call from the vehicle 105 to an emergency responder (not shown in FIG. 2).

The AVC 199 may be configured and/or programmed to provide biometric authentication control for the vehicle 105, including, for example, facial recognition, fingerprint recognition, voice recognition, and/or other provide authenticating information associated with characterization, identification, occupant appearance, occupant status, and/or verification for other human factors such as gait recognition, body heat signatures, eye tracking, etc. The AVC 199 may obtain the sensor information from an external sensory system 281, which may include sensors disposed on a vehicle exterior and in devices connectable with the vehicle 105 such as the mobile device 120 and/or the fob (not shown in FIG. 2).

The AVC 199 may further connect with an internal sensory system 283, which may include any number of sensors configured in the vehicle interior (e.g., the vehicle cabin, which is not depicted in FIG. 2). The external sensory system 281 and internal sensory system 283 can connect with and/or include one or more inertial measurement units (IMUs) 284, camera sensor(s) 285, fingerprint sensor(s) 287, and/or other sensor(s) 289, and obtain biometric data usable for characterization of the sensor information for identification of biometric markers stored in a secure biometric data vault (not shown in FIG. 2) onboard the vehicle 105. The AVC 199 may obtain, from the internal and external sensory systems 281 and 283, sensory data that can include external sensor response signal(s) 279 and internal sensor response signal(s) 275 (collectively referred to as sensory data 290), via the sensor I/O module 203. The AVC 199 (and more particularly, the biometric recognition module 297) may characterize the sensory data 290, and generate occupant appearance and status information to the occupant manager 225, which may use the sensory data 290 according to described embodiments.

The internal and external sensory systems 283 and 281 may provide the sensory data 279 obtained from the external sensory system 281 and the internal sensor response signal(s) 275 from the internal sensory system 283 responsive to an internal sensor request message 273 and an external sensor request message 277, respectively. The sensory data 279 and 275 may include information from any of the sensors 284-289, where the external sensor request message 277 and/or the internal sensor request message 273 can include the sensor modality with which the respective sensor system(s) are to obtain the sensory data.

The camera sensor(s) 285 may include thermal cameras, optical cameras, and/or a hybrid camera having optical, thermal, or other sensing capabilities. Thermal cameras may provide thermal information of objects within a frame of view of the camera(s), including, for example, a heat map figure of a subject in the camera frame. An optical camera may provide a color and/or black-and-white image data of the target(s) within the camera frame. The camera sensor(s) 285 may further include static imaging, or provide a series of sampled data (e.g., a camera feed) to the biometric recognition module 297.

The IMU(s) 284 may include a gyroscope, an accelerometer, a magnetometer, or other inertial measurement device. The fingerprint sensor(s) 287 can include any number of sensor devices configured and/or programmed to obtain fingerprint information. The fingerprint sensor(s) 287 and/or the IMU(s) 284 may also be integrated with and/or communicate with a passive key device, such as, for example, the mobile device 120. The fingerprint sensor(s) 287 and/or the IMU(s) 284 may also (or alternatively) be disposed on a vehicle exterior space such as the engine compartment (not shown in FIG. 2), door panel (not shown in FIG. 2), etc. In other aspects, when included with the internal sensory system 283, the IMU(s) 284 may be integrated in one or more modules disposed within the vehicle cabin or on another vehicle interior surface.

The UECC 187 can include an authentication manager 217, a personal profile manager 219, a command and control module 221, an authorization manager 223, an occupant manager 225, and a power manager 227, among other control components.

The authentication manager 217 may communicate biometric key information 254 to the DAT 299.

Figure 3:
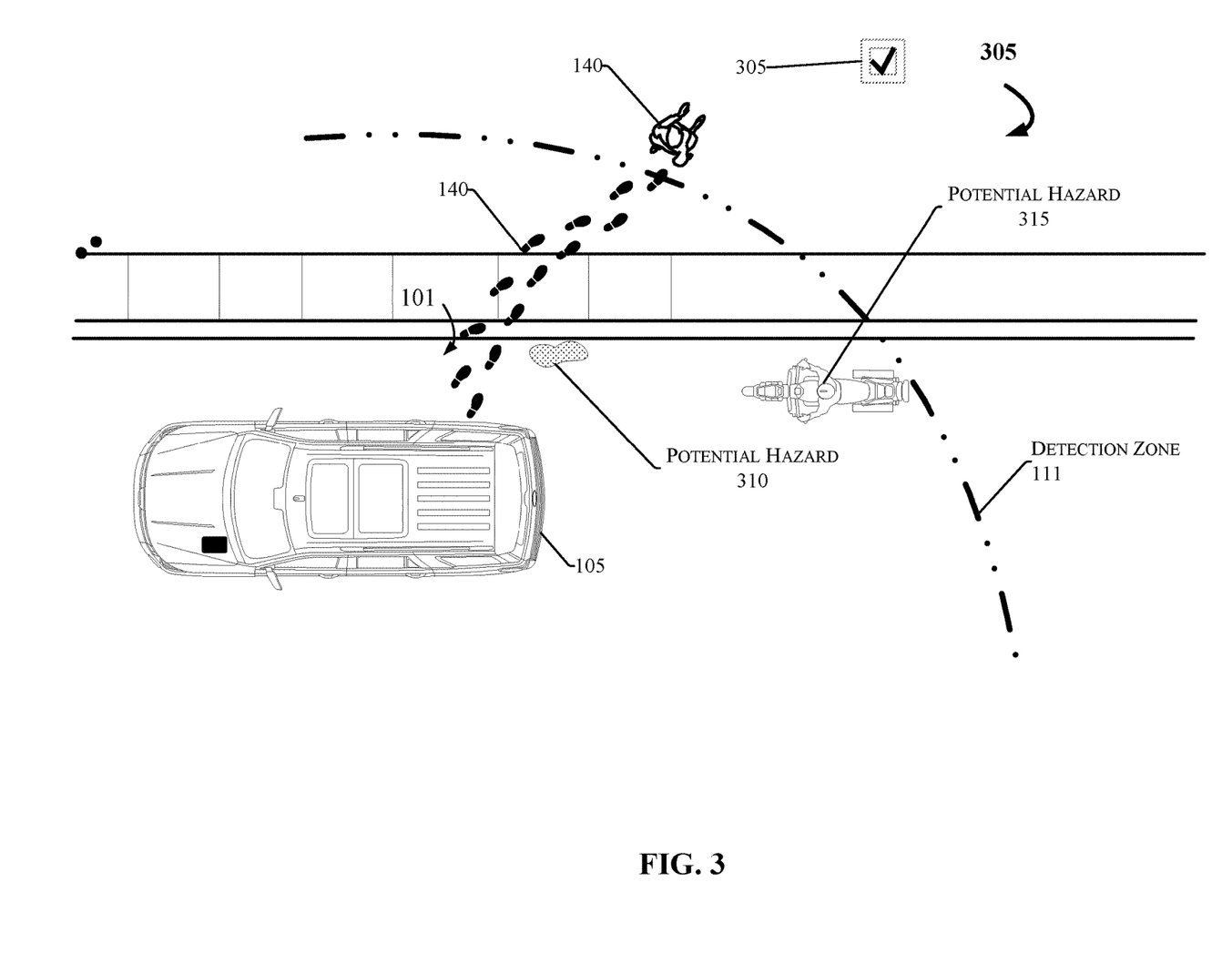
FIG. 3 illustrates dropping off the user at a drop-off site in accordance with the present disclosure.

The authentication manager 217 may further connect with the TCU 160 and communicate biometric status payload information 241 to the TCU 160 indicative of the biometric authentication status of the user 140, requests for key information, profile data, and other information. This may include rider identification information that may be used to associate biometric information and/or other identifying information with a particular user 140. The TCU 160 may send and/or forward digital key payload 291 to the server(s) 170 via the network(s) 125, and receive digital key status payload 293 from the server(s) 170 and provide responsive messages and/or commands to the authentication manager 217 that can include biometric information payload 243. According to other aspects, the rider identification information may include destinations (e.g., the destination point 305 as shown in FIG. 3), hazards associated with particular drop-off locations, alternate drop-off locations, ride or route recalculations associated with particular unique users, and/or particular user 140 needs such as needs for visually impaired, auditory impaired, speech impaired, mobility impaired, or other factors associated with particular users.

Moreover, the authentication manager 217 may be disposed in communication with the BLEM 195, and/or the other vehicle controllers and vehicle controllers 201 according to embodiments described in the present disclosure. For example, the BLEM 195 may send a PaaK wakeup message, or another initiating signal indicating that one or more components should transition from a low-power mode to a ready mode.

The authentication manager 217 may also connect with the personal profile manager 219, and the power manager 227. The personal profile manager 219 may perform data management associated with user profiles, which may be stored in the automotive computer 145 and/or stored on the server(s) 170. For example, the authentication manager 217 may send occupant seat position information 229 to the personal profile manager 219, which may include a seat position index (not shown in FIG. 2) indicative of preferred and/or assigned seating for passengers of the vehicle 105. The personal profile manager 219 may update seating indices, delete and create profiles, and perform other administrative duties associated with individualized user profile management.

The power manager 227 may receive power control commands from the authentication manager 217, where the power control commands are associated with biometric authentication device management. The power manager 227 may send power control acknowledgements 251 to the authentication manager 217 responsive to the control commands 245. For example, responsive to the power and control commands 245 received from the authentication manager 217, the power manager 227 may generate a power control signal 265 and send the power control signal to the biometric recognition module. The power control signal 265 may cause the biometric recognition module to change power states (e.g., wakeup, etc.). The biometric recognition module 297 may send a power control signal response 267 to the power manager 227 indicative of completion of the power control signal 265.

The authentication manager 217 and/or the personal profile manager 219 may further connect with the command and control module 221, which may be configured and/or programmed to manage user permission levels, and control vehicle access interface(s) (not shown in FIG. 2) for interfacing with vehicle users. The command and control module 221 may be and/or include, for example, the BCM 193 described with respect to FIG. 1. For example, the authentication manager 217 may send command and control authentication information 231 that cause the command and control module 221 to actuate one or more devices according to successful or unsuccessful authentication of a device, a signal, a user, etc. The command and control module 221 may send acknowledgements 233 and other information including, for example, vehicle lock status.

The occupant manager 225 may connect with the authentication manager 217, and communicate occupant change information 257 indicative of occupant changes in the vehicle 105 to the authentication manager 217. For example, when occupants enter and exit the vehicle 105, the occupant manager 225 may update an occupant index (not shown in FIG. 2), and transmit the occupant index as part of the occupant change information 257 to the authentication manager. The authentication manager 217 may further connect with the occupant manager 225 to update with seat indices 259, which may include confirmation messages for seat index changes, and occupant entries and exits from the vehicle 105.

The occupant manager 225 may also receive seat indices 259 from the authentication manager 217, which may index seating arrangements, positions, preferences, and other information.

The occupant manager 225 may also connect with the command and control module 221. The command and control module 221 may receive adaptive vehicle control information 239 from the occupant manager 225, which may communicate and/or include settings for vehicle media settings, seat control information, occupant device identifiers, and other information.

The occupant manager 225 may be disposed in communication with the AVC 199, and may communicate biometric mode update information 261 to the biometric recognition module 297, which may include instructions and commands for utilizing particular modalities of biometric data collection from the internal sensory system 283 and/or the external sensory system 281. The occupant manager 225 may further receive occupant status update information and/or occupant appearance update information (collectively shown as information 263 in FIG. 2) from the biometric recognition module 297.

FIG. 3 depicts another view of the vehicle 105 dropping off the user 140 at a drop-off site 101, in accordance with the present disclosure. The vehicle 105 may arrive at the drop-off site 101 and determine any one or more possible hazards 310 such as a pothole (potential hazard 310), or an approaching motorcycle (potential hazard 315) that may be coming near a side of the vehicle 105, where the user 140 may be struck by the moving motorcycle as the user 140 exits the vehicle 105. Accordingly, the drop-off sensory system 107 may identify, after arriving at the drop-off site 101, a localized drop-off point, and create the detection zone 111. The detection zone 111 may be defined as an electronically generated geofence that creates an outer bound, inside of which the vehicle 105 may sense the potential hazards 110 using the VPS 181. As shown in FIG. 3, the user 140 may receive an auditory or visual warning from the drop-off sensory system 107 indicating that a hazard (e.g., the motorcycle 315) is approaching on the passenger side of the vehicle 105. In another example, the vehicle 105 may have arrived at the drop-off site 101, however the vehicle 105 may have positioned the egress point for the user 140 to exit the vehicle directly in front of the potential hazard 310 (a pothole). Accordingly, the drop-off sensory system 107 may cause the AV drive system to pull forward to a second point (e.g., 10 feet further than the initial drop-off point) to position the egress point past the potential hazard 310.

The vehicle 105 may issue a warning to the user 140 of the approaching danger. The warning may be an auditory message or warning, a visual message or warning through a display or interior vehicle lighting system, and/or a combination of these and other types of warnings.

The user 140 may wait for the relative danger to pass (e.g., an approaching vehicle or pedestrian) or alternatively, choose to override the warning and request to exit the vehicle 105, thereby assuming the risk of the relative danger. One example may be a display that provides an "exit with acknowledgement of the danger" message, and a user-selectable input that allows the user to provide an acknowledgement of the relative risk. Responsive to determining that the risk has past or responsive to receiving the user acknowledgement and request for drop off, the vehicle 105 may provide means for user exit of the vehicle 105 (e.g., by unlocking a door, opening a door, etc.).

Accordingly, the user is shown exiting the vehicle 105 and walking from the drop-off site 101 to a destination point 305 (which may be within walking distance).

In some aspects, the vehicle 105 may be further commissioned for delivery of packages. The packages may be received by another logistics/ridehail vehicle, a human recipient, a robotic package delivery system, or another recipient. Accordingly, the vehicle 105 may generate a communication to a receiving device (or in the case of a robotic delivery system, to a delivery robot) indicating the package drop off time, location, and indications of any known or perceived potential hazards. For example, the relative hazard may be scheduled drop off in a region known for high instances of criminal activity. In one embodiment, the vehicle 105 may further communicate with the device/user that has commissioned the ridehail service to deliver the package, and provide updates and one or more user-selectable options for accepting a relative risk associated with the package drop off. For example, the user receiving the warning message may elect to acknowledge the relative risk in view of a time urgency for the delivery of the package, or select an alternate drop off location that mitigates the perceived or known risk.

Figure 4:
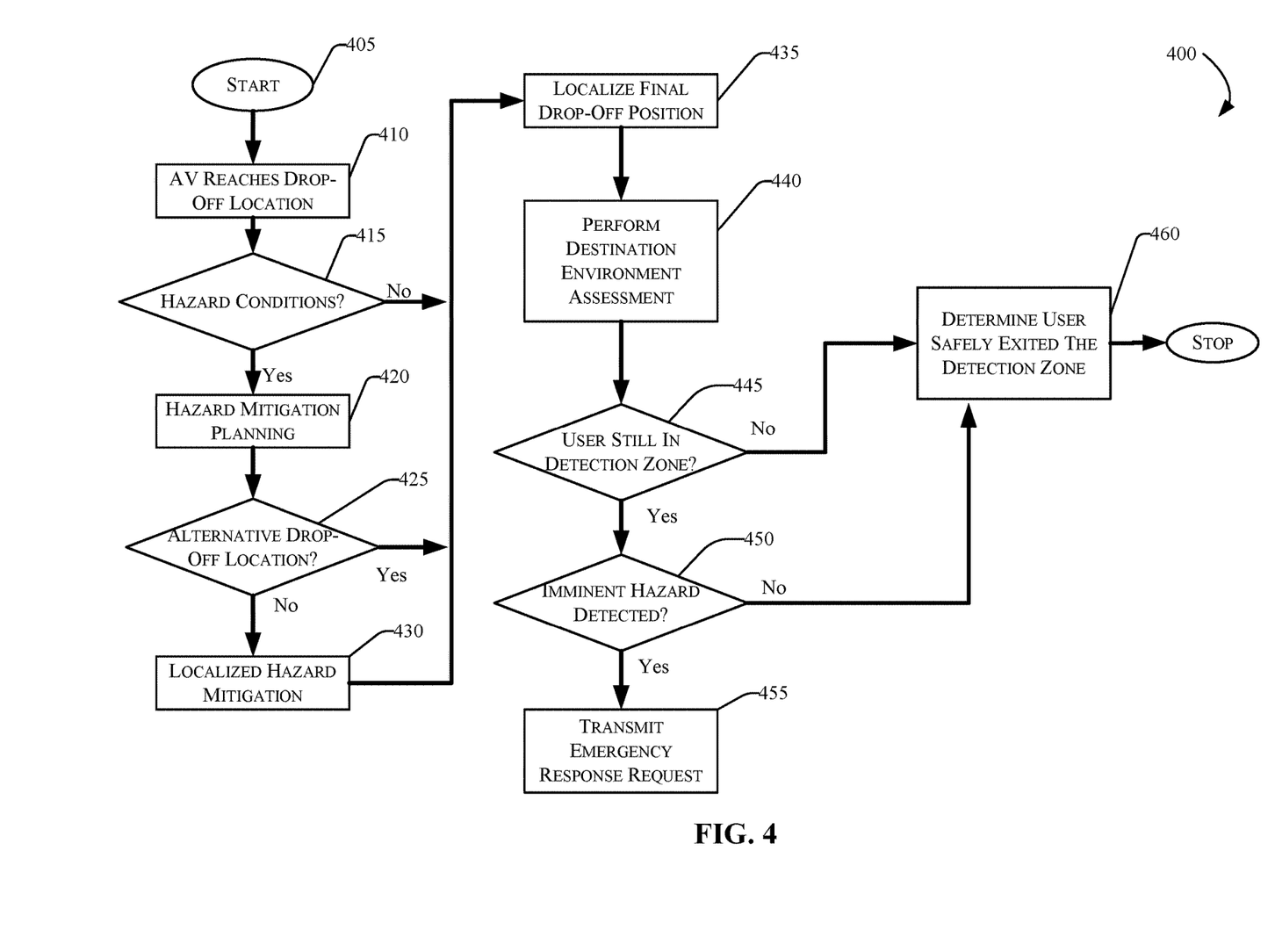
FIG. 4 illustrates a flow diagram of a method for controlling an autonomous vehicle in accordance with one embodiment.

FIG. 4 illustrates a flow diagram 400 of a method for controlling an autonomous vehicle in accordance with one embodiment. Starting first at step 405, the process flow illustrated in the flow diagram 400 includes proceeding to a drop off location, then at step 410, the AV arrives at the drop-off location. In most cases, the drop-off sensory system 107 has identified a user identity associated with the user 140 riding in the vehicle 105 prior to entering the vehicle 105. The vehicle 105 may identify the user via facial recognition or another biometric recognition indicator, by identifying the user's 140 mobile device 120, where the user 140 may carry and/or use the mobile device 120 having profile information and/or other user-identifying data, and/or via a fob or another solid state device having data encoded on the device where the vehicle 105 may identify the user using the device, or some other means for identifying the identity of the user 140.

At step 410 the AV may reach the drop-off location. After arrival, the vehicle 105 may use the VPS 181 to create a detection zone proximate to the vehicle 105 when the vehicle is localized in a first drop-off location associated with the destination. For example, the destination may be the drop-off location. In another example, the destination may be nearby the drop-off location, where the user 140 may walk to the destination from the drop-off location. Although the destination may be outside the detection zone, the vehicle 105 may determine at step 415 whether there are one or more hazards within sensory reach of the vehicle. Stated another way, the drop-off sensory system 107 may cause the sensory system 182 to identify hazards within the detection zone and generate a localization of the hazard. For example, the hazard may be a pothole proximate to the egress point of the user 140. The vehicle 105 may localize the pothole with respect to the egress point. In another example, the hazard may be a high crime area that is generally within the detection zone (and logically outside the detection zone as well). In another example, there may be an infrastructure defect present within the detection zone such as a broken sidewalk, construction, a moving pedestrian or traveler on a bicycle or other moving hazard. Localizing may be determining, with respect to a common point on the vehicle, a distance laterally and horizontally with respect to the vehicle 105, and/or the point of egress of the user 140, and/or with respect to a position of the user 140 (when the user has exited the vehicle 105).

Responsive to determining that there is a hazard condition in the detection zone, at step 420 the drop-off sensory system 107 may perform one or more hazard mitigation planning steps. Hazard mitigation planning may include characterizing the potential hazard identified at step 415, and determining that a first probability of realizing a risk associated with the hazard is less than a first probability threshold. For example, a characterization of a risk of personal injury of stepping in a pothole may have an acceptable threshold of x, where a probability of x+5 that the user would realize the risk of stepping in the pothole exceeds the acceptable probability threshold x. In such a case, the drop-off sensory system 107 may determine whether an alternative drop-off location is necessary and/or reasonably possible at step 425. This may take in account the nature of the hazard and further consider the ability of mitigating that risk with a warning to the user 140. If a warning to the user 140 may not sufficiently mitigate the risk of realizing the hazard, at step 435 the drop-off sensory system 107 may localize a final drop-off position that is different than the first drop-off location. Accordingly the drop-off sensory system 107 may plan an alternative action such as choosing an alternate drop-off location and notifying the user 140 of the alternative drop off location and the reason for the same. For example, the drop-off sensory system 107 may cause, based on the first probability of realizing the risk, a vehicle 105 action that navigates to a second drop-off location associated with the destination, based on the localization of the hazard, may be a preferred course of action. After relocating the vehicle to second drop-off location, the drop-off sensory system 107 may again determine that a second probability of realizing the risk associated with the hazard is less than a first probability threshold. This means that the relative risk of stepping in that or another possible pothole is less than the probability threshold that would indicate an acceptable risk.

Accordingly, the system 440 may perform a destination environment assessment again to determine if the probability of harm is within an acceptable range of probability. Responsive to determining that the risk is mitigated, the drop-off sensory system 107 may generate a vehicle door actuation that permits the user 140 to exit the vehicle 105 based on the first probability of realizing the risk.

In another example, the relative hazard may be that the drop-off location is secluded, and publicly-available information associated with the geographic region indicates that the drop-off area is a high crime area. If the user remains near the vehicle 105 the drop-off sensory system 107 may send a message to the user asking if there is imminent danger. Responsive to receiving a response from the user 140, the drop-off sensory system 107 may determine that the user simply has not left the detection zone for a personal reason other than the presence of the hazard. In another aspect, the drop-off sensory system 107 may determine that the hazard is still imminent, and thus, it may be appropriate to call a backup AV to assist the user 140 through the last leg of their trip to the final destination. If there is no response from the user 140 for some pre-determined time (e.g., 3 minutes, 5 minutes, etc.) then the system will continue with a default plan of action, which may include, for example, determining that the user 140 has not left for personal reasons. This step may include sending a small message service (SMS) message to the user 140 requesting confirmation, an automated mobile device call, or another action.

At step 445 the drop-off sensory system 107 may determine if the user 140 is still localized within the detection zone. Responsive to determining at step 450 if the imminent hazard is detected, the drop-off sensory system 107 may cause to transmit an emergency response request at step 455. For example, if the imminent hazard is criminal activity in or near the detection zone, and the user 140 is still within the detection zone after a predetermined period of time, the drop-off sensory system 107 may call a police officer to visit the scene. In another aspect, the drop-off sensory system 107 may determine that the user has safely exited the detection zone at step 460. The drop-off sensory system 107 may determine that the user's trip is concluded, and that user has proceeded to their intended destination from the drop-off location.

Figure 5:
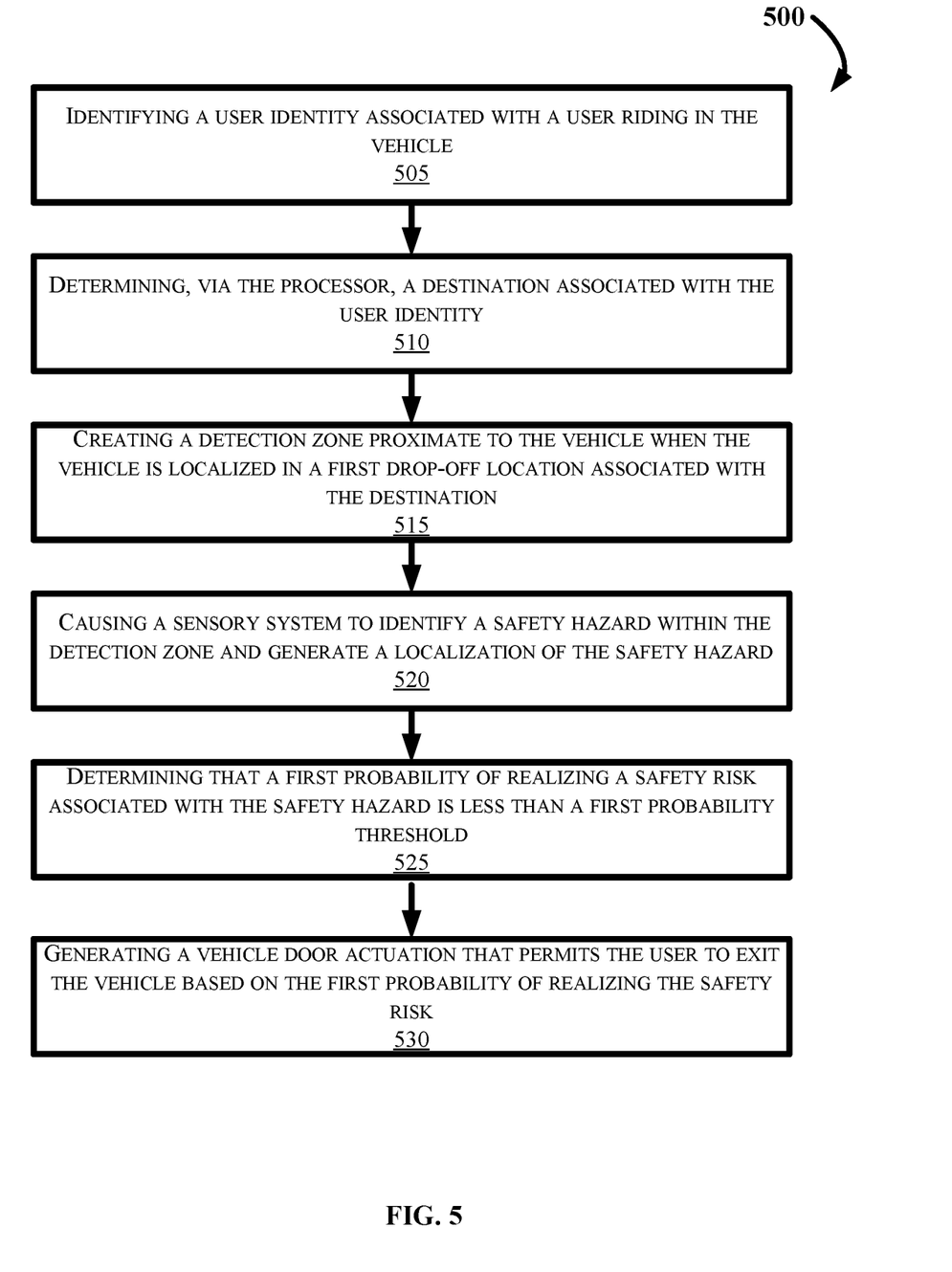
FIG. 5 depicts a flow diagram of an example method for controlling an autonomous vehicle in accordance with the present disclosure.

FIG. 5 is a flow diagram of an example method 500 for controlling an AV, according to the present disclosure. FIG. 5 may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, at step 505, the method 500 may commence with identifying, via a processor, a user identity associated with a user riding in the vehicle.

At step 510, the method 500 may further include determining, via the processor, a destination associated with the user identity.

At step 515, the method 500 may further include creating, via the processor, a detection zone proximate to the vehicle when the vehicle is localized in a first drop-off location associated with the destination. This step may include causing, based on the first probability of realizing the risk, a vehicle action that navigates to a second drop-off location associated with the destination based on the localization of the hazard.

At step 520, the method 500 may further include causing, via the processor, a sensory system to identify a hazard within the detection zone and generate a localization of the hazard. This step may include sensing, via a vehicle sensory system, that the user is localized within the detection zone. The system may determine that the second probability of realizing the risk is greater than a second probability threshold, and localize, via the vehicle sensory system, the user while the user walks to the destination from the second drop-off location.

At step 525, the method 500 may further include determining, via the processor, that a first probability of realizing a risk associated with the hazard is less than a first probability threshold. This step may include causing, based on the first probability of realizing the risk, a vehicle action that navigates to a second drop-off location associated with the destination based on the localization of the hazard. The drop-off sensory system 107 may determine that a second probability of realizing the risk associated with the hazard is less than a first probability threshold, and generate the vehicle door actuation that permits the user to exit the vehicle based on the second probability of realizing the risk.

At step 530, the method 500 may further include generating a vehicle door actuation that permits the user to exit the vehicle based on the first probability of realizing the risk. This step may include causing a signal to be sent to a door access panel and/or to a door actuator, whereby the door actuator opens a door latch, a door lock, or other device. For example, door actuation may include opening the door and also closing/locking the door in case of detecting a hazard and notifying the user. The user can make a decision and choose to over-ride this closing/locking and request a door open. The method may further include creating a record choice or logs for future reference that notes that the user has chosen to accept the relative risk associated with the hazard.

Embodiments of the present disclosure may build user confidence in AV ridehail services with fusion of sensor data and user preferences that can enhance rider security once they reach their destination, and help users to choose an appropriate place to drop off. In other aspects, the described systems and methods may mitigate risks associated with mobility services and provide awareness of forgotten belongings which can increase convenience and a positive user experience.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle, comprising:
   determining a destination associated with a user riding in the vehicle;
   determining a detection zone proximate to the vehicle at a first drop-off location associated with the destination;
   identifying a hazard within the detection zone and a location of the hazard;
   determining that a first probability of realizing a risk associated with the hazard is greater than a first probability threshold;
   actuating, based on the first probability of realizing the risk being greater than the first probability threshold, a vehicle door in a manner wherein a signal is sent to a door access panel of the vehicle door and/or is sent to a door actuator of the vehicle door in order to cause the vehicle door to lock at the first drop-off location;
   over-riding actuation of the vehicle door with the user to cause the vehicle door to open, thereby causing a display of the vehicle to provide an assumption of risk message, and a user-selectable input that allows the user to provide an acknowledgement based on the assumption of risk message;
   creating logs for future reference which note that the user has chosen to accept the risk associated with the hazard; and
   responsive to the user exiting the vehicle, causing the vehicle to wait nearby the user as an escort such that the vehicle monitors the user by establishing a geofence around the vehicle until it is determined that the user has moved a predetermined distance with respect to the geofence.

2. The method according to claim 1, wherein the first probability of realizing the risk is based on an infrastructure characteristic associated with the first drop-off location.

3. The method according to claim 1, wherein the first probability of realizing the risk is based on one or more of a crime map and criminal activity associated with the first drop-off location.

4. The method according to claim 1, wherein the first probability of realizing the risk is based on an external street or walkway limitation.

5. The method according to claim 1, wherein the first probability of realizing the risk is based on a distance from the first drop-off location to the destination.

6. The method according to claim 1, further comprising:
   determining, responsive to determining that the user has exited the vehicle, that the user has left a belonging in an interior of the vehicle; and
   generating one or more of a visual signal and/or an audio signal indicative that the user has left the belonging in the vehicle interior.

7. The method according to claim 1, wherein the signal is sent to the door access panel of the vehicle door and is sent to the door actuator of the vehicle door in order to cause the vehicle door to lock at the first drop-off location.

8. A system, comprising:
   a processor; and
   a memory for storing executable instructions, the processor programmed to execute the instructions to:
   identify a user identity associated with a user riding in a vehicle;
   determine a destination associated with the user identity;
   create a detection zone proximate to the vehicle when the vehicle is localized in a first drop-off location associated with the destination;
   cause a sensory system to identify a hazard within the detection zone and generate a localization of the hazard;
   determine that a first probability of realizing a risk associated with the hazard is greater than a first probability threshold;

generate a vehicle door actuation in a manner wherein a signal is sent to a door access panel of the vehicle door and/or is sent to a door actuator of the vehicle door in order to cause the vehicle door to lock based on the first probability of realizing the risk;

over-ride the actuation of the vehicle door with the user to cause the vehicle door to open, thereby causing a display of the vehicle to provide an assumption of risk message, and a user-selectable input that allows the user to provide an acknowledgement based on the assumption of risk message;

create logs for future reference which note that the user has chosen to accept the risk associated with the hazard;

responsive to the user exiting the vehicle, cause the vehicle to wait nearby the user as an escort such that the vehicle monitors the user by establishing a geofence around the vehicle until it is determined that the user has moved a predetermined distance with respect to the geofence.

9. The system according to claim 8, wherein the first probability of realizing the risk is based on an infrastructure characteristic associated with the first drop-off location associated with the destination.

10. The system according to claim 8, wherein the first probability of realizing the risk is based on one or more of a crime map and criminal activity associated with the first drop-off location.

11. The system according to claim 8, wherein the first probability of realizing the risk is based on an external street or walkway limitation.

12. The system according to claim 8, wherein the first probability of realizing the risk is based on a distance from the first drop-off location to the destination.

13. The system according to claim 8, wherein the processor is further caused to execute the instructions to determine, responsive to determining that the user has exited the vehicle, that the user has left a belonging in an interior of the vehicle by using weight sensors of the vehicle, and generate one or more of a visual signal and/or an audio signal indicative that the user has left the belonging in the vehicle interior.

14. A non-transitory computer-readable storage medium having instructions stored thereupon which, when executed by a processor, cause the processor to:

identify a user identity associated with a user riding in a vehicle;

determine a destination associated with the user identity;

create a detection zone proximate to the vehicle when the vehicle is localized in a first drop-off location associated with the destination;

cause a sensory system to identify a hazard within the detection zone and generate a localization of the hazard;

determine that a first probability of realizing a risk associated with the hazard is greater than a first probability threshold;

generate a vehicle door actuation in a manner wherein a signal is sent to a door access panel of the vehicle door and/or is sent to a door actuator of the vehicle door in order to cause the vehicle door to lock based on the first probability of realizing the risk;

over-ride actuation of the vehicle door with the user to cause the vehicle door to open, thereby causing a display of the vehicle to provide an assumption of risk message, and a user-selectable input that allows the user to provide an acknowledgement based on the assumption of risk message;

create logs for future reference which note that the user has chosen to accept the risk associated with the hazard;

responsive to the user exiting the vehicle, cause the vehicle to wait nearby the user as an escort such that the vehicle monitors the user by establishing a geofence around the vehicle until it is determined that the user has moved a predetermined distance with respect to the geofence.

15. The non-transitory computer-readable storage medium according to claim 14, wherein the first probability of realizing the risk is based on an infrastructure characteristic associated with the first drop-off location associated with the destination.

16. The non-transitory computer-readable storage medium according to claim 15, wherein the storage medium further has instructions stored thereupon which, when executed by a processor, cause the processor to determine, responsive to determining that the user has exited the vehicle, that the user has left a belonging in an interior of the vehicle by using weight sensors of the vehicle, and generate one or more of a visual signal and/or an audio signal indicative that the user has left the belonging in the vehicle interior.

* * * * *